O. OSTLIN & F. RUDOLPHI.
DOUBLE SEAMING MACHINE.
APPLICATION FILED MAY 29, 1908.

920,634.

Patented May 4, 1909.
5 SHEETS—SHEET 1.

Witnesses:
Wm. Geiger
N. W. Munday

Inventors:
Olaf Ostlin
Frank Rudolphi
By Munday, Evarts, Adcock & Clarke,
Attorneys

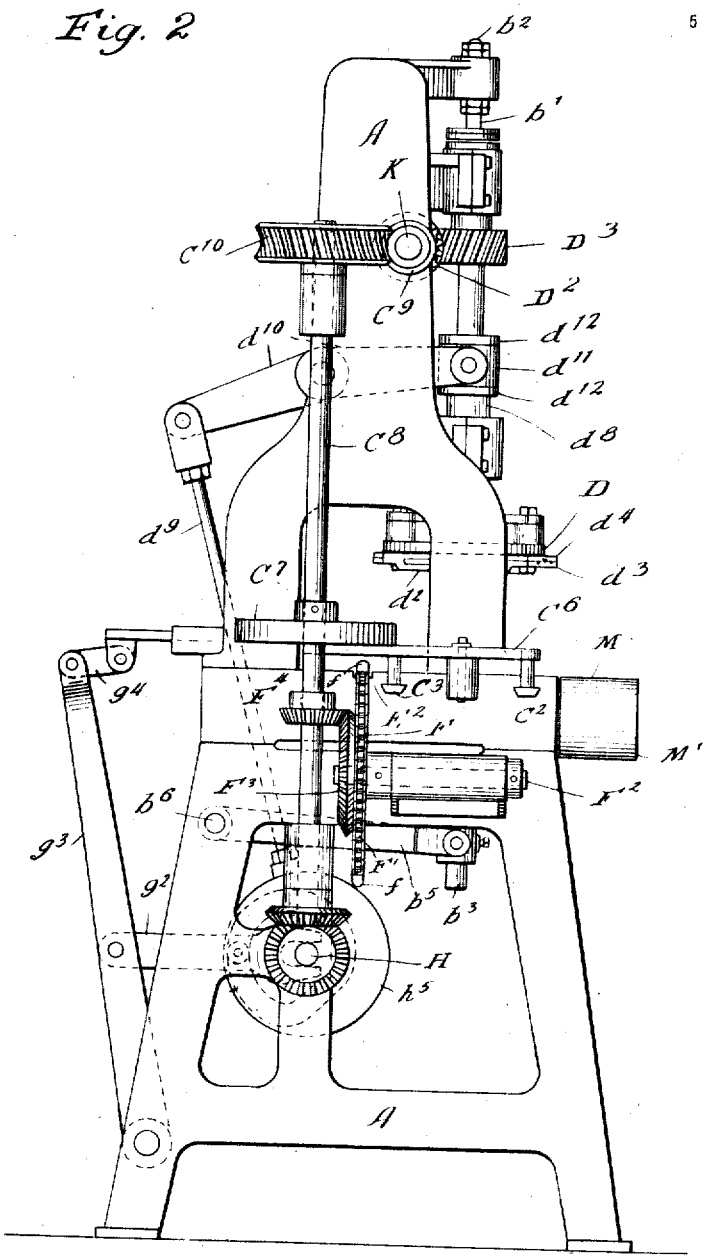

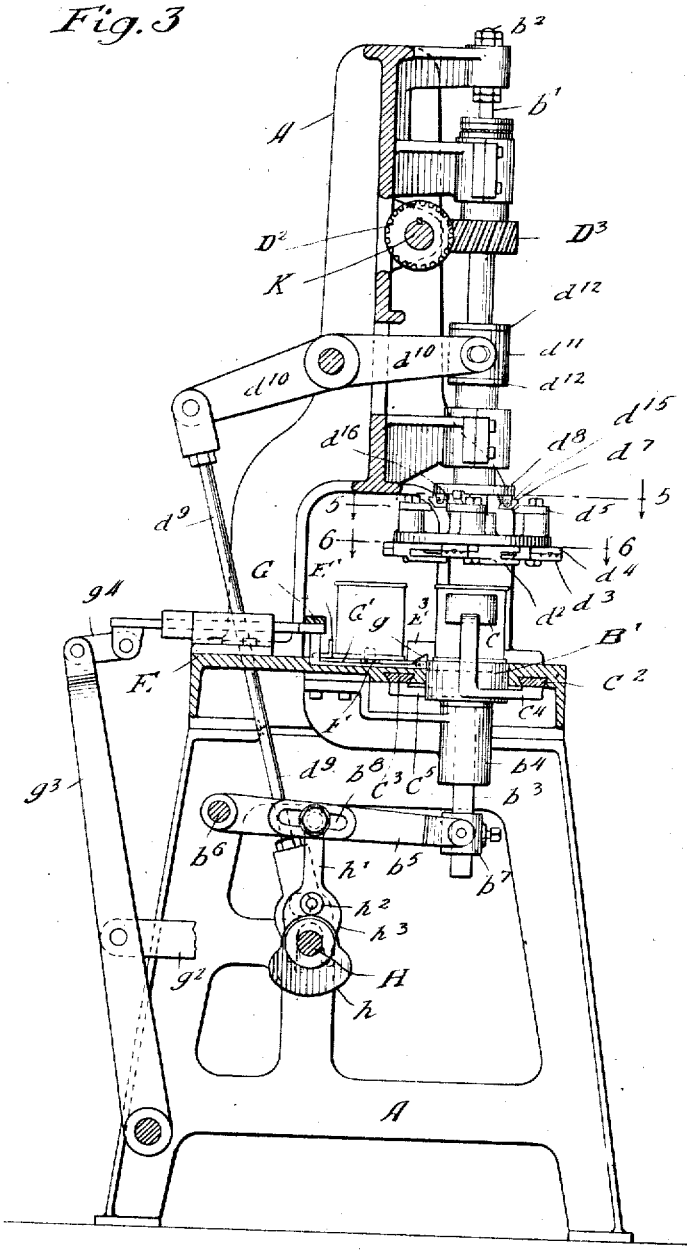

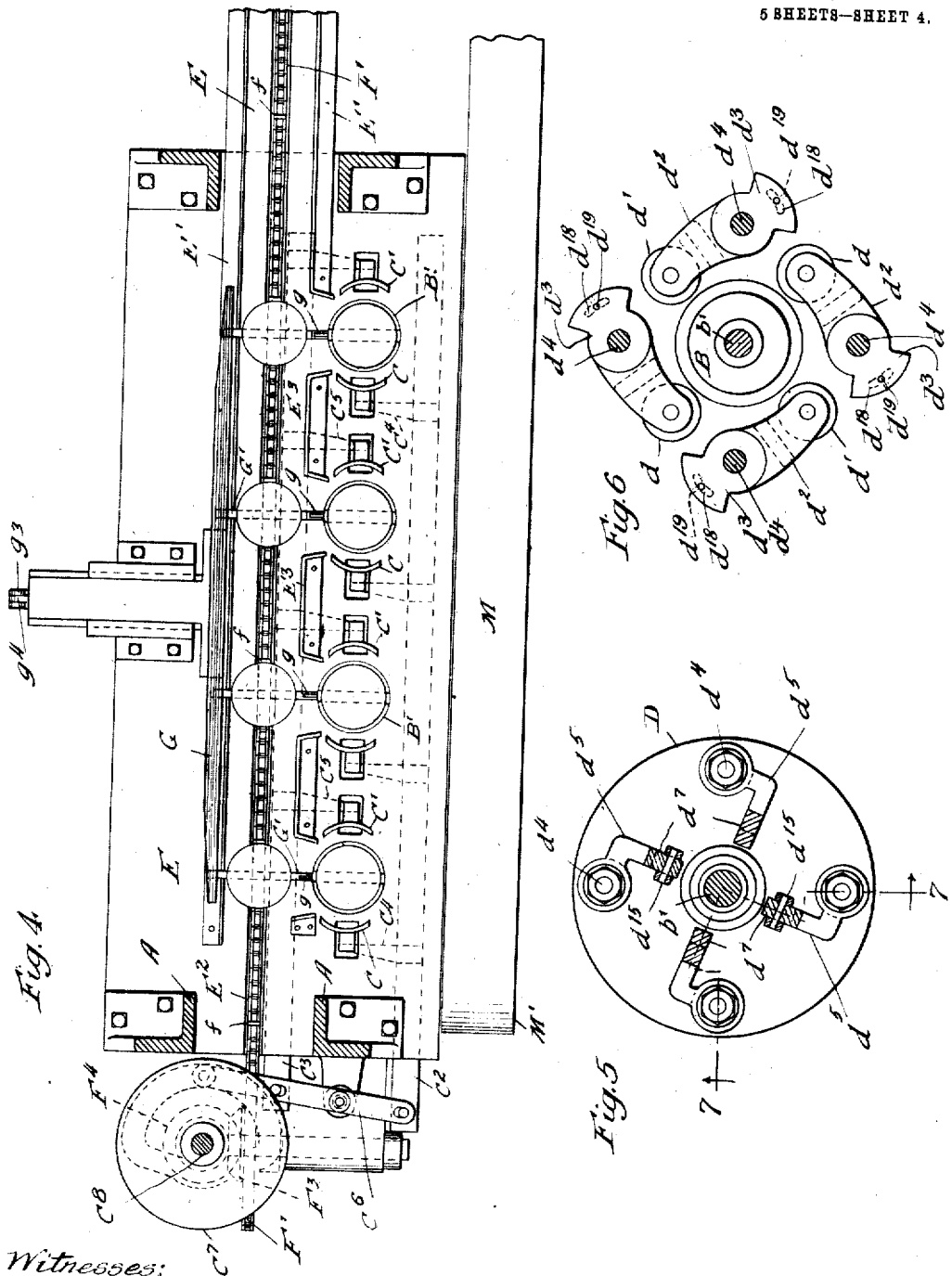

O. OSTLIN & F. RUDOLPHI.
DOUBLE SEAMING MACHINE.
APPLICATION FILED MAY 29, 1908.

920,634.

Patented May 4, 1909.
5 SHEETS—SHEET 5.

Witnesses:
Wm. Geiger
H. W. Munday

Inventors
Olaf Ostlin
Frank Rudolphi
By Munday, Evarts, Adcock & Clark,
Attorneys

UNITED STATES PATENT OFFICE.

OLAF OSTLIN, OF MAYWOOD, AND FRANK RUDOLPHI, OF CHICAGO, ILLINOIS, ASSIGNORS TO AMERICAN CAN COMPANY, OF NEW YORK, N. Y., A CORPORATION OF NEW JERSEY.

DOUBLE-SEAMING MACHINE.

No. 920,634.  Specification of Letters Patent.  Patented May 4, 1909.

Application filed May 29, 1908. Serial No. 435,620.

*To all whom it may concern:*

Be it known that we, OLAF OSTLIN, a citizen of the United States, and a resident of Maywood, in the county of Cook, in the State of Illinois, and FRANK RUDOLPHI, a citizen of the United States, residing in Chicago, in the county of Cook and State of Illinois, have invented a new and useful Improvement in Double-Seaming Machines, of which the following is a specification.

This invention relates to improvements in double seaming machines.

The object of the invention is to provide a double seaming machine of high capacity so that the heads or covers upon filled or other cans may be very rapidly secured to the bodies by perfect and hermetically tight double seams.

The invention consists in connection with a series of can holding chucks or disks mounted upon the stationary frame of the machine, of a series of rotary seaming heads also mounted upon the stationary frame of the machine, and each furnished with a plurality of seaming rollers and means for actuating the same, a series of opening and closing can centering jaws for centering the cans with the can holding disks and rotary seaming heads before the can holding disks or chucks close upon the cans, a can conveyer, and a can feeder operating to simultaneously feed a plurality of cans from the conveyer to the can holding chucks or disks, and can ejectors or discharging devices for delivering or discharging the seamed cans from the can holding and seaming devices.

The invention further consists in the novel construction of parts and devices and in the novel combinations of parts and devices herein shown and described.

Figure 1:
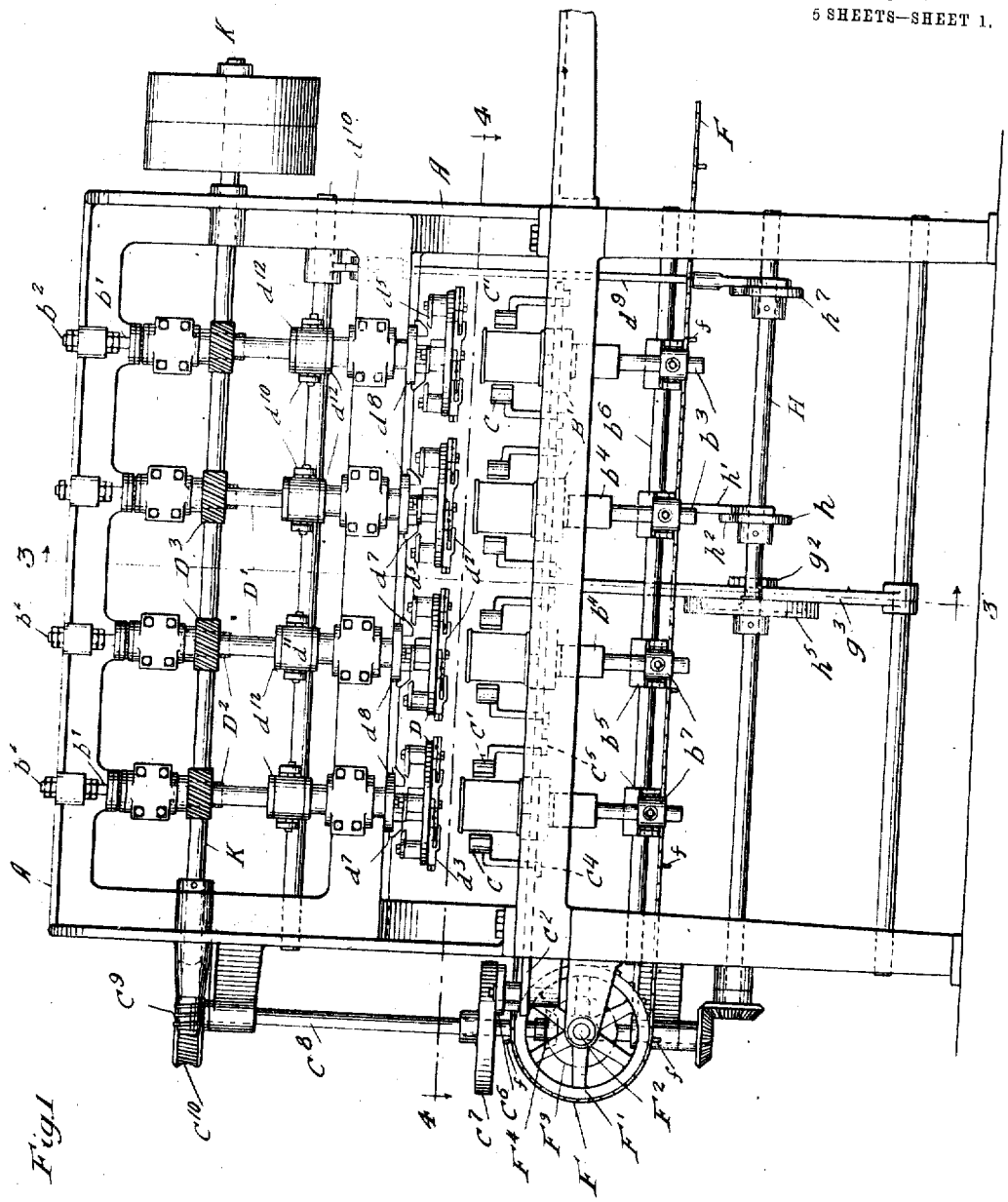
Figure 7:
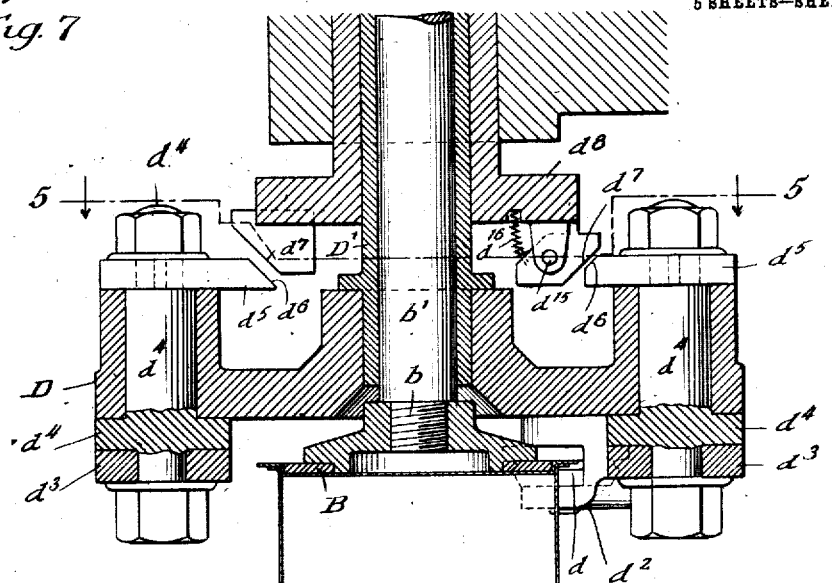
Figure 8:
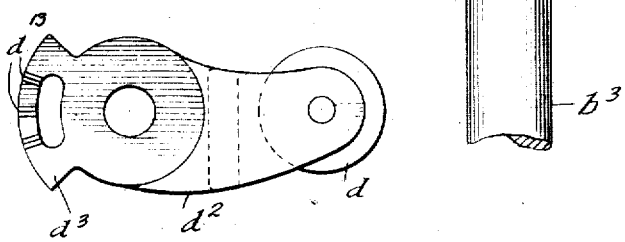
Figure 9:
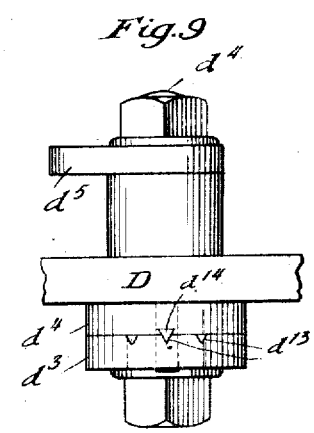

In the accompanying drawing forming a part of this specification, Figure 1 is a front elevation of a double seaming machine embodying the invention. Fig. 2 is an end elevation. Fig. 3 is a vertical section on line 3—3 of Fig 1. Fig. 4 is a horizontal section on line 4—4 of Fig. 1. Figs. 5 and 6 are detail sections of one of the rotary seaming heads on lines 5—5 and 6—6 of Fig. 3. The section line 5—5 is also shown in Fig. 7. Fig. 7 is an enlarged vertical section of one of the rotary seaming heads on the broken line 7—7 of Fig. 5. Fig. 8 is a detail plan view of one of the seaming roller levers and Fig. 9 is a detail elevation of a portion of one of the rotary seaming heads.

In the drawing, A represents the frame of the machine, B B$^1$ the upper and lower can holder chucks or disks, preferably four in number, the several pairs being arranged in a row or in line with each other, C C$^1$ opening and closing can centering jaws or clamps, preferably four pairs, or one pair for each pair of can holder chucks or disks B B$^1$, D D the rotary seaming heads, one for each pair of can holders, E the can feed table, F the can conveyer, G the can feeder and G$^1$ the ejectors or discharge devices for the seamed cans.

The frame A may be of any suitable construction adapted to give support to the other parts.

Each of the upper can holder chucks or disks B is removably secured by screw threads $b$ to an upright stationary shaft or stem $b^1$, which is adjustably secured to the frame of the machine by threaded ends $b^2$ so that it may be adjusted up or down as required for coöperation with the seaming rollers.

Each of the lower can holder chucks or disks B$^1$ is furnished with a stem $b^3$ and is reciprocated up and down as required in the guide $b^4$ on the frame of the machine by means of an operating lever $b^5$, pivoted to the frame at $b^6$, and which lever is connected at its other end by a clamp sleeve $b^7$ with the operating stem $b^3$ of said holder B$^1$. Each of the operating levers $b^5$ is actuated by a cam $h$ on the cam shaft H through a connecting link $h^1$, the connecting link $h^1$ having a roller $h^2$ engaging the cam $h$, and a guide fork $h^3$ fitting astride the cam shaft H.

The series of pairs of can centering jaws or clamps C C$^1$ are reciprocated or opened and closed as required by reciprocating slides C$^2$ C$^3$ on the frame of the machine, the slide C$^2$ having arms C$^4$ to which the jaws C are secured, and the slide C$^3$ having arms C$^5$ to which the opposing clamps or jaws C$^1$ are secured. The slides or reciprocating bars C$^2$ C$^3$ are actuated as required by means of a lever C$^6$ to which said slides C$^2$ C$^3$ are pivotally connected, and which lever C$^6$ is actuated by a cam C$^7$ on the upright shaft C$^8$ which is operated from the driving shaft K through a worm and worm gear C$^9$ C$^{10}$.

Each of the rotary seaming heads D is secured to a rotating sleeve $D^1$ surrounding the stationary stem $b^1$ of the upper can holder chuck or disk, and is continuously rotated as required from the driving shaft K through the spiral gears $D^2$ $D^3$.

Each of the rotary seaming heads D is furnished with a plurality of double seaming rollers $d^1$, preferably four in number, one pair of rollers $d$ $d$ being seam forming rollers, and the other pair $d^1$ $d^1$ seam closing rollers.

Each of the seaming rollers $d$ or $d^1$ are preferably journaled upon a seaming roller lever $d^2$, having an adjustable member or arm $d^3$, a fulcrum member $d^4$ and an operating arm $d^5$ furnished with a cam or incline $d^6$ adapted to be engaged by a cam or incline $d^7$ on a reciprocating sleeve $d^8$ which rotates with the seaming head, but is adapted to be moved up and down thereon as required to properly actuate the seaming rollers. The seaming roller actuating sleeve $d^8$ of each rotary seaming head is reciprocated as required to actuate the seaming rollers by means of a cam $h^7$ on the cam shaft H through the connecting link $d^9$, lever $d^{10}$ and fulcrum sleeve $d^{11}$ which is secured or confined on said operating sleeve $d^8$ by collars $d^{12}$. The adjustable arms $d^3$ of the seaming roller levers $d^2$ are preferably furnished with adjustable notches or devices $d^{13}$ $d^{14}$ to facilitate the adjusting or setting of the same for operation upon cans of different diameters and also with interfitting slots and pins $d^{18}$ $d^{19}$.

The cams or inclines $d^7$ through which the seaming rollers $d$ perform the first or seam forming operation, are preferably movably secured to the operating sleeve $d^8$ by a pivot pin $d^{15}$ and held yieldingly in position by a spring $d^{16}$ so as to cause the seaming roller to exert a yielding pressure.

The can feed table E is preferably furnished with guide rails $E^1$ for the cans, and with a way or channel $E^2$ for the can conveyer F.

The can conveyer F is preferably an endless chain furnished with arms $f$ to engage the cans and feed them along. The conveyer F is actuated by a sprocket wheel $F^1$ on the shaft $F^2$, having a bevel gear $F^3$ which meshes with a bevel gear $F^4$ on the upright shaft $C^8$.

The can feeder G preferably consists of a transversely reciprocating bar adapted to engage simultaneously as many cans on the feed table E as there are rotary seaming heads D. As the can conveyer F moves the cans along the feed table E, the transversely reciprocating feeder G feeds or pushes four cans simultaneously off of the conveyer F onto the lower up and down reciprocating can holders $B^1$, the cans being approximately guided into position by transversely extending guides $E^3$ on the feed table. Then the several pairs of can centering jaws C $C^1$ close upon the can bodies and center them accurately with the can holders D $D^1$ and the rotary seaming heads D. Simultaneously with the closing of the can centering jaws C $C^1$, the lower can holder $B^1$ moves upward and firmly clamps the can between itself and the upper can holder chuck or disk B, and then the operating sleeves $d^8$ of the rotary seaming heads actuate the seaming rollers, first the seam forming pair of rollers $d$ $d$, and subsequently the seam closing rollers $d^1$ $d^1$. The seaming rollers are then withdrawn from contact with the finished seam, the centering jaws C $C^1$ open and the lower can holder chucks or disks $B^1$ descend to the level of the can feed table E and then the ejectors or can discharging devices $G^1$ push or deliver the seamed cans out of the machine onto the can discharge conveyer M, which is preferably a belt actuated by a pulley $M^1$.

Each of the ejectors or can discharge devices $G^1$ preferably consists of a bent arm secured to the can feeder G, and furnished with a dog $g$ for engaging the can at its lower end. The lower chucks $B^1$ are furnished with grooves $B^2$ to accommodate the can ejectors $G^1$.

The can feeder G is preferably transversely reciprocated as required by means of cam $h^5$ on the cam shaft H through the connecting links $g^2$, levers $g^3$ and connecting links $g^4$.

The lever $b^5$ for operating the lower can holder chuck $B^1$ is provided with a slot $b^8$ for connection with the link $h^1$ so that the throw of the lever $b^5$ and chuck $B^1$ may be adjusted as required for operation upon cans of different heights.

We claim:—

1. In a double seaming machine, the combination with a series of pairs of can holder chucks, of a series of pairs of can centering jaws, a series of rotary seaming heads furnished with seaming rollers and seaming roller actuating devices, a can conveyer and a can feeder for feeding a plurality of cans simultaneously from the conveyer to the can holders and can centering jaws, substantially as specified.

2. In a double seaming machine, the combination with a series of pairs of can holder chucks, of a series of pairs of can centering jaws, a series of rotary seaming heads furnished with seaming rollers and seaming roller actuating devices, a can conveyer and a can feeder for feeding a plurality of cans simultaneously from the conveyer to the can holders and can centering jaws, and a series of can ejecting or discharge devices, substantially as specified.

3. In a double seaming machine, the combination with a plurality of pairs of opposing can holders mounted on the stationary frame of the machine, of a plurality of rotary seaming heads furnished with seaming rollers and means for feeding a plurality of cans simultaneously to the can holders, substantially as specified.

4. In a double seaming machine, the combination with a plurality of pairs of opposing can holders mounted on the stationary frame of the machine, of a plurality of rotary seaming heads furnished with seaming rollers, means for feeding a plurality of cans simultaneously to the can holders, and a plurality of pairs of opening and closing can centering jaws, substantially as specified.

5. In a seaming machine, the combination with a stationary frame, of a plurality of pairs of opposing upper and lower can holders mounted on said frame, and a plurality of rotary seaming heads also mounted in said frame, each axially in line with a pair of said can holders, substantially as specified.

6. In a seaming machine, the combination with a stationary frame, of a plurality of can holders mounted on said frame, of a plurality of rotary seaming heads also mounted in said frame, and means for feeding a plurality of cans simultaneously to the can holders, substantially as specified.

7. In a seaming machine, the combination with a stationary frame, of a plurality of can holders mounted on said frame, of a plurality of rotary seaming heads also mounted in said frame, means for feeding a plurality of cans simultaneously to the can holders, and a can conveyer, substantially as specified.

8. In a seaming machine, the combination with a stationary frame, of a plurality of can holders mounted on said frame, a plurality of rotary seaming heads also mounted in said frame, and means for simultaneously ejecting or discharging a plurality of cans from the holders, substantially as specified.

9. In a seaming machine, the combination with a stationary frame, of a plurality of can holders mounted on said frame, a plurality of rotary seaming heads also mounted in said frame, means for feeding a plurality of cans simultaneously to the can holders, and means for simultaneously ejecting or discharging a plurality of cans from the holders, substantially as specified.

10. In a seaming machine, the combination with a stationary frame, of a plurality of can holders mounted on said frame, of a plurality of rotary seaming heads also mounted in said frame, means for feeding a plurality of cans simultaneously to the can holders, a can conveyer and means for simultaneously ejecting or discharging a plurality of cans from the holders, substantially as specified.

11. In a seaming machine, the combination with a stationary frame, of a plurality of can holders mounted on said frame, of a plurality of rotary seaming heads also mounted in said frame and a plurality of pairs of opening and closing can centering jaws mounted in said frame, substantially as specified.

12. In a seaming machine, the combination with a stationary frame, of a plurality of can holders mounted on said frame, of a plurality of rotary seaming heads also mounted in said frame, means for feeding a plurality of cans simultaneously to the can holders and a plurality of pairs of opening and closing can centering jaws mounted on said frame, substantially as specified.

13. In a seaming machine, the combination with a stationary frame, of a plurality of can holders mounted on said frame, of a plurality of rotary seaming heads also mounted in said frame, means for feeding a plurality of cans simultaneously to the can holders, a can conveyer and a plurality of pairs of opening and closing can centering jaws mounted on said frame, substantially as specified.

14. In a seaming machine, the combination with a stationary frame, of a plurality of can holders mounted on said frame, a plurality of rotary seaming heads also mounted in said frame, means for feeding a plurality of cans simultaneously to the can holders, means for simultaneously ejecting or discharging a plurality of cans from the holders, and a plurality of pairs of opening and closing can centering jaws mounted on said frame, substantially as specified.

15. In a double seaming machine, the combination with a plurality of opposing pairs of can holders mounted on the stationary frame of the machine, of a plurality of rotary seaming heads furnished with seaming rollers, means for feeding a plurality of cans simultaneously to the can holders, a plurality of pairs of opening and closing can centering jaws and a plurality of can discharge devices, substantially as specified.

16. In a double seaming machine, the combination with a series of pairs of can holder chucks, of a series of pairs of can centering jaws, a series of rotary seaming heads furnished with seaming rollers and seaming roller actuating devices, a can conveyer and a can feeder for feeding a plurality of cans simultaneously from the conveyer to the can holders and can centering jaws, each of said seaming heads having a reciprocating sleeve for actuating the seaming rollers thereof substantially as specified.

OLAF. OSTLIN.
FRANK RUDOLPHI.

Witnesses:
H. M. Munday,
Pearl Abrams.